US011350373B2

(12) United States Patent
Takeda et al.

(10) Patent No.: US 11,350,373 B2
(45) Date of Patent: May 31, 2022

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Yuichi Kakishima, Tokyo (JP); Tooru Uchino, Tokyo (JP); Liu Liu, Beijing (CN); Huiling Jiang, Beijing (CN); Li Zhao, Beijing (CN); Yong Li, Beijing (CN); Mugen Peng, Beijing (CN); Wenbo Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 816 days.

(21) Appl. No.: 15/127,671

(22) PCT Filed: Mar. 18, 2015

(86) PCT No.: PCT/JP2015/058124
§ 371 (c)(1),
(2) Date: Sep. 20, 2016

(87) PCT Pub. No.: WO2015/141747
PCT Pub. Date: Sep. 24, 2015

(65) Prior Publication Data
US 2017/0142667 A1 May 18, 2017

(30) Foreign Application Priority Data
Mar. 20, 2014 (JP) .............................. JP2014-058670

(51) Int. Cl.
H04W 52/36 (2009.01)
H04L 5/00 (2006.01)
H04W 52/34 (2009.01)

(52) U.S. Cl.
CPC ........... *H04W 52/365* (2013.01); *H04L 5/001* (2013.01); *H04W 52/34* (2013.01)

(58) Field of Classification Search
CPC ...... H04L 5/001; H04W 52/34; H04W 52/365
See application file for complete search history.

(56) References Cited

U.S. PATENT DOCUMENTS

2011/0312366 A1* 12/2011 Yang .................. H04W 52/365
455/522
2012/0178494 A1* 7/2012 Haim .................. H04W 52/365
455/522

(Continued)

FOREIGN PATENT DOCUMENTS

CN 102893679 A 1/2013
JP 2013-520054 A 5/2013

OTHER PUBLICATIONS

Panasonic, "Uplink transmission power management and PHR reporting for dual connectivity," 3GPP TSG RAN WG2 Meeting #84; R2-140477; San Francisco, USA; Nov. 11-15, 2013 (resubmission of R2-133945) (3 pages).

(Continued)

Primary Examiner — Kashif Siddiqui
(74) Attorney, Agent, or Firm — Osha Bergman Watanabe & Burton LLP

(57) ABSTRACT

The present invention is designed to reduce the decrease of uplink throughput in the event a user terminal connects with a plurality of radio base stations. A user terminal (20) according to an example of the present invention provides a user terminal to connect with a plurality of radio base stations including at least a first radio base station and a second radio base station, and this user terminal has a PH report generating section (411) that calculates the PH (Power Headroom) of each radio base station and generates PH reports, and a transmission section (203) that transmits (Continued)

either the PUSCH (Physical Uplink Shared Channel) bandwidth of the first radio base station, a PH report per resource block, or information about the transmission power density, and a PH report for the first radio base station, to the second radio base station.

7 Claims, 16 Drawing Sheets

(56) References Cited

U.S. PATENT DOCUMENTS

| | | | | |
|---|---|---|---|---|
| 2012/0207112 | A1* | 8/2012 | Kim | H04W 52/54 370/329 |
| 2013/0010720 | A1 | 1/2013 | Lohr et al. | |
| 2013/0016676 | A1 | 1/2013 | Lohr et al. | |
| 2013/0051259 | A1* | 2/2013 | Kim | H04W 52/365 370/252 |
| 2013/0336228 | A1* | 12/2013 | Zhao | H04W 52/365 370/328 |
| 2014/0135049 | A1* | 5/2014 | Hirata | H04L 1/0026 455/501 |
| 2015/0365831 | A1* | 12/2015 | Ko | H04L 5/0053 370/329 |
| 2016/0081045 | A1* | 3/2016 | Bostrom | H04W 52/367 370/329 |
| 2016/0150485 | A1* | 5/2016 | Yi | H04W 52/34 370/311 |
| 2016/0198421 | A1* | 7/2016 | Yi | H04W 52/346 370/329 |

OTHER PUBLICATIONS

Qualcomm Incorporated, "Physical layer aspects for dual connectivity," 3GPP TSG RAN WG1 #76; R1-140455; Prague, Czech Republic; Feb. 10-14, 2014 (5 pages).
Huawei, HiSilicon, "PHR operation for Dual Connectivity," 3GPP TSG-RAN WG2 Meeting #85; R2-140056; Prague, Czech Republic; Feb. 10-14, 2014 (3 pages).
3GPP TS 36.300 V8.12.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Mar. 2010 (149 pages).
Notification of Reasons for Rejection issued in JP2014-058670, dated Feb. 3, 2016, with translation (5 pages).
International Search Report issued in PCT/JP2015/058124, dated Jun. 16, 2015 (1 page).
Written Opinion issued in PCT/JP2015/058124, dated Jun. 16, 2015 (3 pages).
Extended European Search Report issued in corresponding European Patent Application No. 15764901.3, dated Sep. 22, 2017 (7 pages).
Office Action in counterpart Chinese Patent Application No. 201580015109.5 dated Mar. 12, 2019 (17 pages).

* cited by examiner

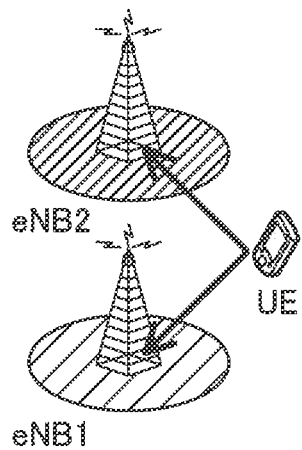
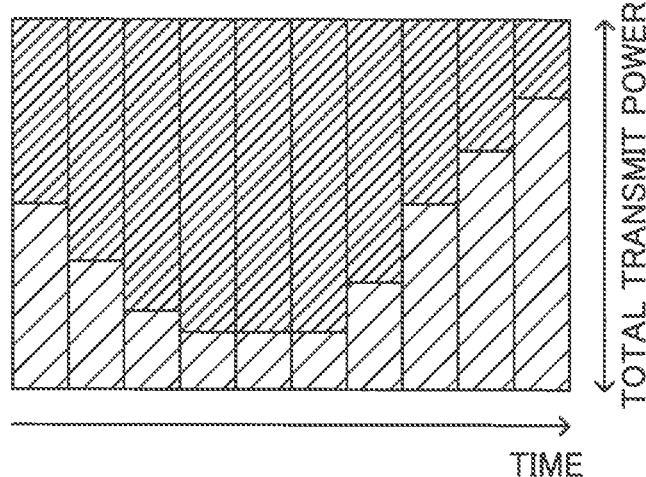
FIG.4A
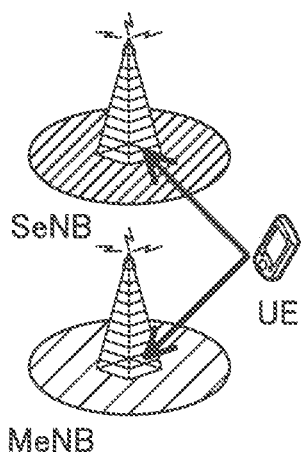
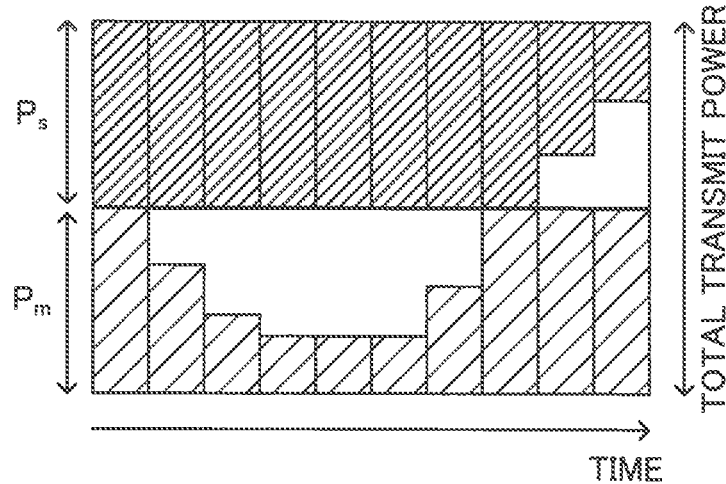
FIG.4B

| $C_7$ | $C_6$ | $C_5$ | $C_4$ | $C_3$ | $C_2$ | $C_1$ | R |
|---|---|---|---|---|---|---|---|
| P | V | \multicolumn{6}{c|}{PH (TYPE 2, PCell)} |
| R | R | \multicolumn{6}{c|}{$P_{CMAX,c}$ 1} |
| \multicolumn{8}{|c|}{$VPH_{M1}$} |
| P | V | \multicolumn{6}{c|}{PH (TYPE 1, PCell)} |
| R | R | \multicolumn{6}{c|}{$P_{CMAX,c}$ 2} |
| \multicolumn{8}{|c|}{$VPH_{M2}$} |
| P | V | \multicolumn{6}{c|}{PH (TYPE 1, SCell 1)} |
| R | R | \multicolumn{6}{c|}{$P_{CMAX,c}$ 3} |
| \multicolumn{8}{|c|}{$VPH_{M3}$} |

...

| P | V | PH (TYPE 2, pSCell) |
|---|---|---|
| R | R | $P_{CMAX,c}$ i+1 |
| \multicolumn{3}{|c|}{$VPH_{S1}$} |
| P | V | PH (TYPE 1, pSCell) |
| R | R | $P_{CMAX,c}$ i+2 |
| \multicolumn{3}{|c|}{$VPH_{S2}$} |
| P | V | PH (TYPE 1, SCell 3) |
| R | R | $P_{CMAX,c}$ i+3 |
| \multicolumn{3}{|c|}{$VPH_{S3}$} |

...

FIG.7 ically independently control the uplink transmission power of user terminals, this may result in a decrease of uplink throughput, a deterioration of communication quality, and so on.

USER TERMINAL, RADIO BASE STATION AND RADIO COMMUNICATION METHOD

TECHNICAL FIELD

The present invention relates to a user terminal, a radio base station, a radio communication system and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE—referred to as, for example, "LTE-advanced" or "LTE enhancement"—have been under study for the purpose of achieving further broadbandization and increased speed beyond LTE, and the specifications thereof have been drafted as LTE Rel. 10/11 (LTE-A).

Also, the system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When the radio base stations to form a plurality of cells are in effect the same, the above-described carrier aggregation (CA) is applicable. On the other hand, when the radio base stations to form a plurality of cells are completely different, dual connectivity (DC) may be employed.

Note that carrier aggregation (CA) may be referred to as "intra-eNB CA," and dual connectivity (DC) may be referred to as "inter-eNB CA."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

As noted earlier, when the radio base stations to form a plurality of cell groups are the same in effect (for example, when CA is employed), the radio base station can control uplink transmission power taking into account the uplink transmission power of user terminals in each cell in a comprehensive manner. However, as in dual connectivity (DC), when a plurality of radio base stations independently control the uplink transmission power of user terminals, this may result in a decrease of uplink throughput, a deterioration of communication quality, and so on.

The present invention has been made in view of the above, and it is therefore an object of the present invention to provide a user terminal, a radio base station, a radio communication method and a radio communication system that can reduce the decrease of uplink throughput when a user terminal connects with a plurality of radio base stations.

Solution to Problem

The user terminal according to an embodiment of the present invention provides a user terminal that communicates by using a plurality of cell groups, and this user terminal has a generating section that generates PH reports, including a PH (Power Headroom) of every cell forming the cell groups, and a transmission section that transmits the PH reports generated for each cell group, and, in this user terminal, a PH report which the transmission section transmits in a given cell group includes a PH that pertains to another cell group and that does not rely on a PUSCH (Physical Uplink Shared Channel) bandwidth.

Advantageous Effects of Invention

According to the present invention, the decrease of uplink throughput when a user terminal connects with a plurality of radio base stations can be reduced.

BRIEF DESCRIPTION OF DRAWINGS

FIG. 7 is a diagram to show an example MAC CE, including real PHRs and virtual PHRs.

DESCRIPTION OF EMBODIMENTS

Now, embodiments of the present invention will be described below in detail with reference to the accompanying drawings. Note that, when the following description mentions a physical downlink control channel (PDCCH: Physical Downlink Control Channel), this will include an enhanced physical downlink control channel (EPDCCH: Enhanced PDCCH) as well.

In the LTE-A system, a HetNet (Heterogeneous Network), in which small cells, each having a local coverage area of a radius of approximately several tens of meters, are formed within a macro cell having a wide coverage area of a radius of approximately several kilometers, is under study. Carrier aggregation (CA) and dual connectivity (DC) are applied to the HetNet structure.

FIG. 1 provide schematic diagrams of carrier aggregation (CA) and dual connectivity (DC). In the examples shown in FIG. 1, a user terminal UE communicates with radio base stations eNB1 and eNB2.

FIG. 1 show control signals that are transmitted and received via a physical downlink control channel (PDCCH) and a physical uplink control channel (PUCCH: Physical Uplink Control Channel). For example, downlink control information (DCI) is transmitted using the PDCCH. Also, uplink control information (UCI) is transmitted via the PUCCH.

Figure 1A:
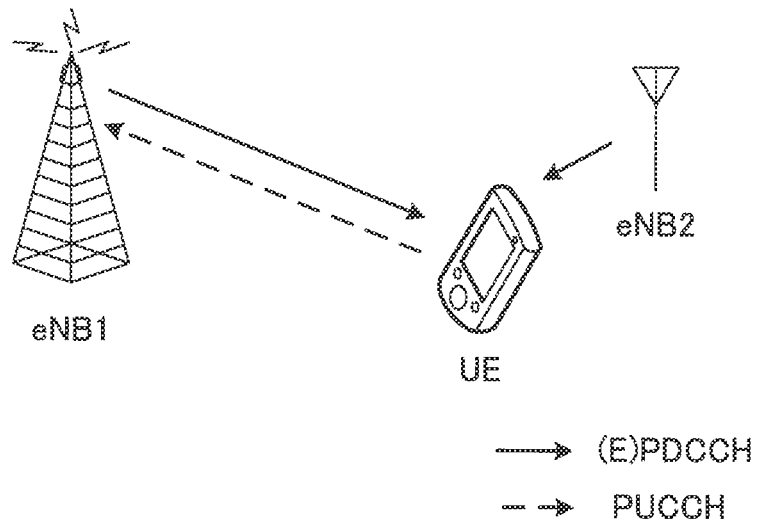
FIG. 1 provide schematic diagrams of carrier aggregation (CA) and dual connectivity (DC)

FIG. 1A shows communication among the radio base stations eNB1 and eNB2 and the user terminal UE by way of carrier aggregation (CA). In the example shown in FIG. 1A, eNB1 is a radio base station to form a macro cell (hereinafter referred to as a "macro base station"), and eNB2 is a radio base station to form a small cell (hereinafter referred to as a "small base station").

For example, the small base station may be structured like an RRH (Remote Radio Head) that connects with the macro base station. When carrier aggregation (CA) is employed, one scheduler (for example, the scheduler provided in macro base station eNB1) controls the scheduling of multiple cells.

In a structure in which a scheduler provided in a macro base station controls the scheduling of multiple cells, each base station may be connected using, for example, an ideal backhaul that provides a high speed channel such as optical fiber.

Figure 1B:
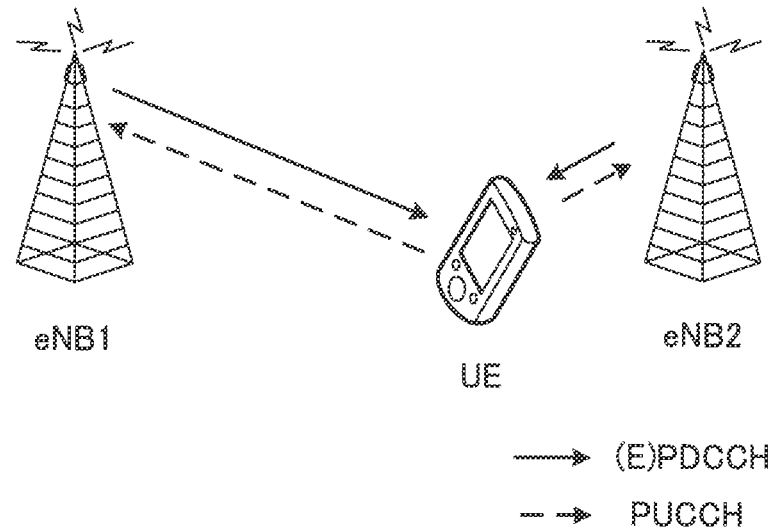

FIG. 1B shows communication among radio base stations eNB1 and eNB2 and a user terminal UE by way of dual connectivity (DC). In the example shown in FIG. 1B, eNB1 and eNB2 are both macro base stations.

When dual connectivity (DC) is employed, a plurality of schedulers are provided independently, and these multiple schedulers (for example, the scheduler provided in macro base station eNB1 and the scheduler provided in macro base station eNB2) each control the scheduling of one or more cells they have control over.

In the structure in which the scheduler provided in macro base station eNB1 and the scheduler provided in macro base station eNB2 each control the scheduling of one or more cells they have control over, each base station may be connected using, for example, a non-ideal backhaul to produce delays that cannot be ignored, such as the X2 interface.

Figure 2:
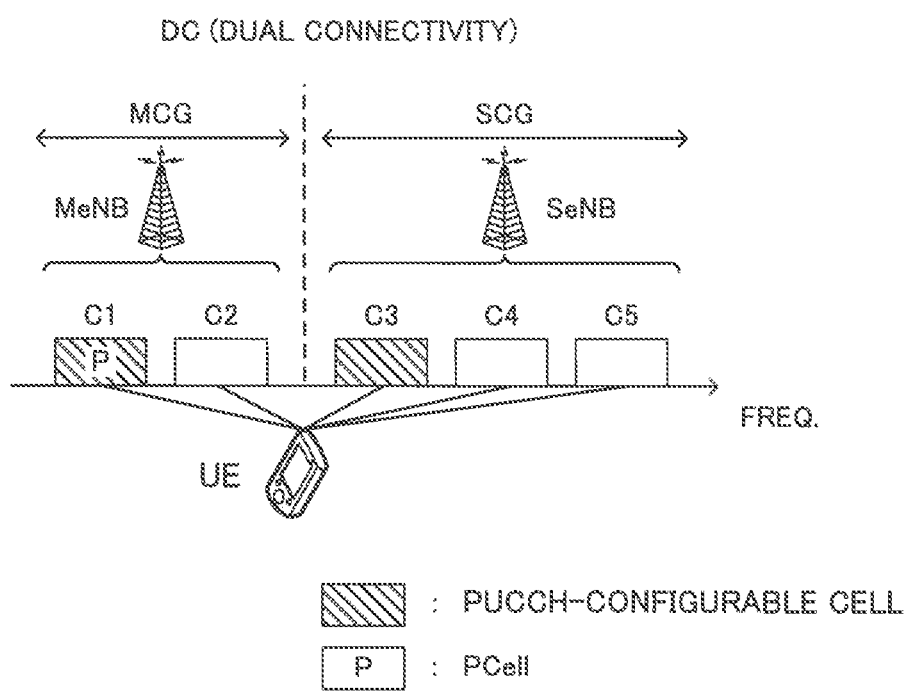
FIG. 2 is a diagram to show an example cell group structure in dual connectivity (DC), FIG. 3 provide conceptual diagrams to explain extra transmission power PH in user terminals, FIG. 4 provide diagrams to explain transmission power control in carrier aggregation (CA) and dual connectivity (DC)

FIG. 2 is a diagram to show an example cell group structure in dual connectivity (DC). As shown in FIG. 2, in dual connectivity (DC), each radio base station configures a cell group (CG) that is comprised of one or a plurality of cells. Each cell group (CG) is comprised of one or more cells formed by the same radio base station, or one or more cells formed by the same transmission point such as a transmitting antenna apparatus, a transmission station and so on.

The cell group (CG) to include the PCell will be referred to as the "master cell group (MCG: Master CG)," and the cell groups (CGs) other than the master cell group (MCG) will be referred to as "secondary cell groups (SCGs: Secondary CGs)." Each cell group (CG) can execute carrier aggregation (CA) with two or more cells.

The radio base station where the MCG is configured will be referred to as the "master base station (MeNB: Master eNB)," and the radio base station where an SCG is configured will be referred to as a "secondary base station (SeNB: Secondary eNB)."

The total number of cells to constitute the MCG and the SCGs is configured to be equal to or less than a predetermined value (for example, five (cells)). This predetermined value may be set in advance, or may be configured semi-statically or dynamically between the radio base stations eNB and the user terminal UE. Also, depending on the implementation of user terminals UE, the sum value of the cells to constitute the MCG and the SCGs and the combination of cells that can be configured may be reported to the radio base stations eNB in the form of capability signaling.

Now, the transmission power control (TPC) in user terminals in conventional LTE and LTE-A systems will be described below.

In conventional LTE and LTE-A systems, the uplink signal transmission power $P_{PUSCH,c}(i)$ of a user terminal can be represented by following equation 1:

$$P_{PUSCH,c}(i) = \min\{P_{CMAX,c}(i), 10 \log_{10}(M_{PUSCH,c}(i)) + P_{O\_PUSCH,c}(j) + \alpha_c(j) \cdot PL_c + \Delta_{TF,c}(i) + f_c(i)\} \quad \text{(Equation 1)}$$

Here, $P_{CMAX,c}(i)$ is the maximum transmission power of a user terminal, $M_{PUSCH,c}(i)$ is the bandwidth (for example, the number of resource blocks) of an uplink shared channel (PUSCH: Physical Uplink Shared Channel) allocated by the scheduler, $P_{O\_PUSCH,c}(j)$ is a parameter related to the target received power (for example, a parameter that relates to transmission power offset), $\alpha_c(j)$ is a fractional TPC (Transmission Power Control) weighting coefficient, $PL_c$ is propagation loss (path loss), $\Delta_{TF,c}(i)$ is an offset that is based on the MCS (modulation scheme and coding rate) level assigned by the scheduler, and $f_c(i)$ is a correction value by a TPC command (the accumulated value of TPC commands controlled by the scheduler). Note that each of these parameters may be reported from radio base stations.

A user terminal's extra transmission power $PH_{type1,c}(i)$ can be represented by following equation 2:

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \quad \text{(Equation 2)}$$

Figure 3A:
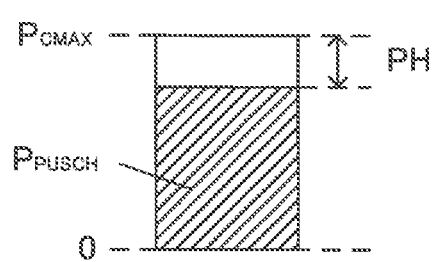

FIG. 3 provide conceptual diagrams to explain extra transmission power (PH: Power Headroom) in a user terminal. As shown in FIG. 3A, when the user terminal's transmission power $P_{PUSCH}$ does not reach the maximum transmission power $P_{CMAX}$, the value that is given by subtracting the transmission power $P_{PUSCH}$ from the maximum transmission power $P_{CMAX}$ is reported as the value of extra transmission power PH.

Figure 3B:
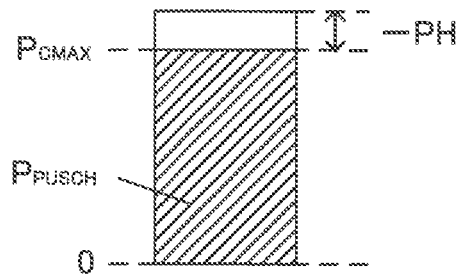

As shown in FIG. 3B, when the user terminal's transmission power $P_{PUSCH}$ exceeds the maximum transmission power $P_{CMAX}$, the actual transmission power is reported as the value of the maximum transmission power $P_{CMAX}$, and, for the value of extra transmission power PH, a negative value is reported based on above equation 2.

Although the user terminal determines transmission power based on above equation 1, if the transmission power reaches the allowable maximum transmission power, the transmission power is adjusted following predetermined priorities.

The user terminal feeds back PHRs (Power Headroom Reports) for reporting the user terminal's extra transmission power, to the radio base stations. A PHR is formed with a PH, which represents information about the difference between the user terminal's transmission power $P_{PUSCH}$ and the maximum transmission power $P_{CMAX}$, and a two-bit reserved field.

FIG. 4 provide diagrams to explain transmission power control in carrier aggregation (CA) and dual connectivity (DC).

As shown in FIG. 4A, in carrier aggregation (CA), one base station (for example, a macro base station eNB1) controls the scheduling of two base stations. That is, macro base station eNB1 can execute transmission power control so that transmission power is adjusted, on a dynamic basis, within a range in which the sum of the user terminal's transmission power for two base stations eNB1 and eNB2 does not exceed the maximum transmission power $P_t$.

Figure 5:
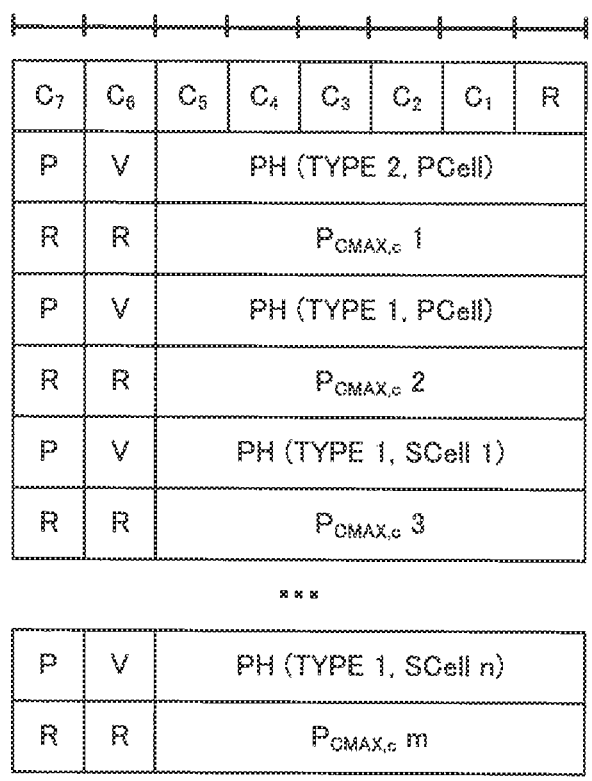
FIG. 5 is a diagram to explain a PHR MAC CE (MAC Control Element) for use in carrier aggregation in conventional LTE systems.

FIG. 5 is a diagram to explain a PHR MAC CE (MAC Control Element) for use in carrier aggregation in conventional LTE systems. Note that FIG. 5 shows a case where a type-2 PH is configured. The PHR MAC CE includes, as shown in FIG. 5, the PHs of a plurality of cell groups, the maximum transmission power $P_{CMAX,c}(i)$ per CC, and so on.

Note that a type-1 PH is a PH that is used on the assumption that the PUSCH alone is transmitted. A type-2 PH is a PH that is used on the assumption that the PUSCH and the PUCCH are transmitted.

As represented by above equation 1, the user terminal's transmission power $P_{PUSCH}$ is calculated based on the path loss PLc, which is estimated from the downlink. The user terminal feeds back a PHR to the base stations when the fluctuation value of path loss is greater than a predetermined value. The base stations know the values of $P_{CMAX,c}(i)$, $M_{PUSCH,c}(i)$, $P_{O\_PUSCH,c}(j)$, $\alpha_c(j)$, $\Delta_{TF,c}(i)$ and $f_c(i)$ in equation 1, and therefore can determine the path loss $PL_c$ by using equation 1 upon acquiring the value of the PHR that is fed back. As a result of this, in a structure in which carrier aggregation is used, uplink transmission power can be controlled adequately with respect to cells that are formed by each radio base station.

Meanwhile, in dual connectivity (DC), cases might occur where, as shown in FIG. 4B, a master base station MeNB and a secondary base station SeNB each carry out scheduling independently, and the two base stations are asynchronous. Consequently, when each base station controls transmission power independently, there is a threat that the sum of the user terminal's transmission power reaches the maximum transmission power $P_t$. Consequently, the transmission power control of carrier aggregation (CA) cannot be applied on an as-is basis.

For a transmission power control method in dual connectivity (DC), as shown in FIG. 4B, a method of splitting a user terminal's transmission power semi-statically is possible. According to this method, maximum transmission power $P_m$ and $P_s$ are configured as thresholds for each cell group (CG), so that the master base station MeNB and the secondary base station SeNB have only to control transmission power within the ranges of the maximum transmission power $P_m$ and $P_s$ for the respective cell groups. Note that the maximum transmission power $P_m$ represents the maximum transmission power on the master base station MeNBside. The maximum transmission power $P_s$ represents the maximum transmission power on the secondary base station SeNBside.

However, when TPC control and PHR control are applied to dual connectivity as in carrier aggregation, each radio base station is unable to learn the situation of transmission power in a user terminal completely, because the MAC schedulers and TPC control are separate between CCs. When a PHR is fed back from the user terminal, a radio base station has no way knowing what parameters the user terminal has used to calculate the extra transmission power PH for cells operating under other radio base stations.

As a result of this, split loss (the white areas shown in FIG. 4B) may be produced. By this means, useless transmission power remains, resulting in a problem of uplink throughput deterioration from the perspective of user data.

Also, there is a threat that the transmission power for a given cell runs short and the uplink throughput of the cell deteriorates. In particular, when transmission power runs short on the master base station MeNBside and the SRB (Signaling Radio Bearer) becomes incommunicable, the problem arises that the connectivity between the user terminal and the network cannot be maintained.

In order to solve this problem, the present inventors have studied the methods of calculating and reporting PH reports to an MeNB and an SeNB in the event dual connectivity (intra-base station CA) is employed. As a result of this, the present inventors have come with the idea that, when a user terminal connects with a plurality of radio base stations including a first radio base station and a second radio base station, and reports a PHR concerning these radio base stations to the second radio base station, the user terminal may report, additionally, either the PUSCH bandwidth of the first radio base station or a PH report that does not rely upon this PUSCH bandwidth. According to this configuration, the second radio base station to communicate with the user terminal can learn the total extra transmission power (the sum of each radio base station's extra transmission power) taking into account the uplink transmission power control of the first radio base station.

Now, the present embodiment will be described below in detail. Note that, although, for ease of explanation, examples will be described below in which a user terminal connects with two radio base stations (MeNB and SeNB) in dual connectivity, this is by no means limiting. For example, the present embodiment is applicable to cases where a user terminal connects and communicates with three or more radio base stations that each execute control with an independent scheduler.

First Embodiment

The first embodiment of the present invention provides a method, in which a user terminal calculates PH reports (PHRs) that relate to cells formed by other radio base stations, and that do not rely on the actual PUSCH bandwidth, and reports these to one radio base station. Here, a PH that does not rely on the PUSCH bandwidth is also referred to as a "virtual PH (VPH)," and a PHR to include a virtual PH is referred to as a "virtual PHR." To be more specific, a virtual PHR is a PHR that is determined without regard to the actual uplink resource allocation when assuming that a specific PUSCH (and/or a PUCCH) is present. Also, for ease of explanation, the actual PH (the conventional PH that is used up to LTE Rel. 11) will be simply referred to as a "real PH," and a PHR to include a real PH will be referred to as a "real PHR."

With the first embodiment, a user terminal can calculate each cell's PHR to report to an MeNB as follows. A PHR for a cell belonging to the MeNB is calculated as a real PHR. For example, the real PHR can be calculated using above equation 2. On the other hand, as for PHRs for a cell belonging to an SeNB, both a real PHR and a virtual PHR of the SeNB are reported.

Also, the user terminal calculates each cell's PHR to report to an SeNB as follows. A PHR for a cell belonging to the SeNB is calculated as a real PHR. On the other hand, as for PHRs for a cell belonging to an MeNB, both a real PHR and a virtual PHR of the MeNB are reported.

Note that, although the present embodiment assumes that a user terminal reports PHRs for all the activated cells (all the serving cells) to both the MeNB and the SeNB, this is by no means limiting.

As a virtual PHR, a PHR for use when assuming that the amount of uplink resource (PUSCH resource) allocation for a given cell is one resource block. In this case, for the virtual PHR, the user terminal reports, for example, the PH for use when $M_{PUSCH,c}(i)=1$ holds in above equation 2. Also, for the real PHR, the user terminal reports, for example, the PH for use when $M_{PUSCH,c}(i)=M$ holds in above equation 2 (M is the bandwidth where the PUSCH is actually allocated). That is, the user terminal reports two pieces of information—namely, power information (real PHR) that includes other eNBs' bandwidths and power information (virtual PHR) that does not include this—to a given eNB. Assume that the parameters pertaining to the PH calculations besides $M_{PUSCH,c}(i)$ have the same values in both PH calculations.

Note that PHRs for use when assuming that the amount of PUSCH resource allocation is a predetermined number of resource block may be used as virtual PHRs.

Figure 6:
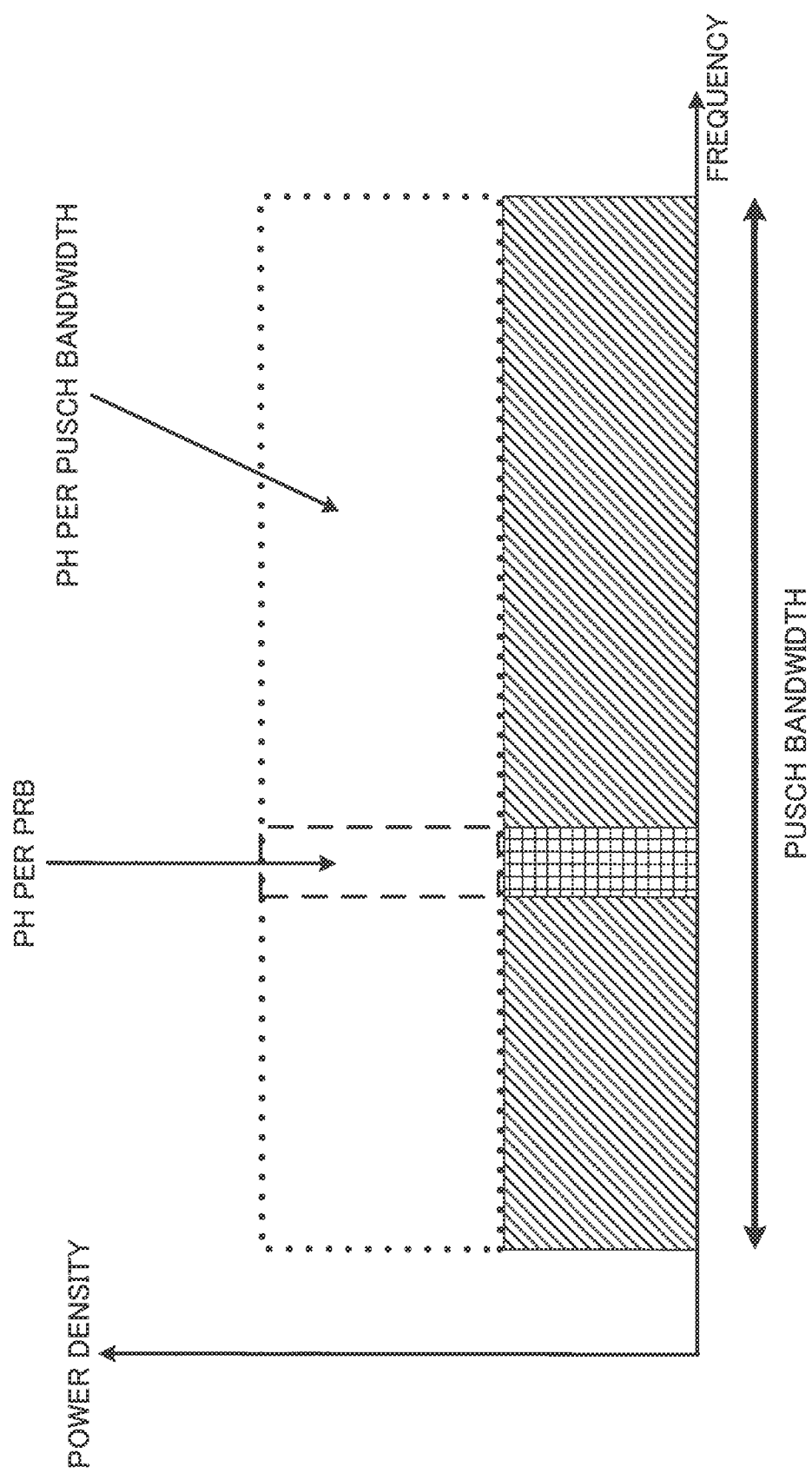
FIG. 6 is a conceptual diagram of a virtual PHR according to a first embodiment.

Now, the meaning of the information represented by a real PHR and a virtual PHR will be described with reference to FIG. 6. FIG. 6 is a conceptual diagram of a virtual PHR according to the first embodiment. FIG. 6 shows the frequency and power density (PSD: Power Spectrum Density) of uplink resources for eNB2 in a user terminal connected with two radio base stations (eNB1 and eNB2) at a given timing.

The portion in FIG. 6 framed by the chain line corresponds to a virtual PH, and represents the PH per resource block (PRB: Physical Resource Block). The power density (the height of the chain line part in FIG. 6) can be learned from the PH per PRB. Note that the power density is determined depending on path loss, interference and son on, and is configured to a value that allows receipt with sufficient power density. That is, the power density is equivalent to greater power than path loss, interference and so on.

The portion in FIG. 6 framed by the dotted line corresponds to a real PH, and represents the PH per PUSCH bandwidth. From the PH per PUSCH bandwidth and the PH per PRB, the bandwidth (for example, the number of PRBs) that is allocated to the PUSCH can be learned. By this means, a radio base station, to which a virtual PHR is reported, can estimate the UL traffic in counterpart eNBs with which the radio base station is engaged in dual connectivity together.

Real PHRs and virtual PHRs may be reported through separate signaling (for example, MAC CE), or may be reported together in one signaling. FIG. 7 is a diagram to show an example of MAC CE in which real PHRs and virtual PHRs are included. Note that FIG. 7 shows a case where a type-2 PH is configured. In FIG. 7, $VPH_{Mi}$, which is a virtual PHR for use in the MeNB, and $VPH_{Si}$, which is a virtual PHR for use in the SeNB, are shown as virtual PHRs.

In FIG. 7, PHs for all the activated cells configured in the MeNB and the SeNB are included, and Ci shows which cell's PH is included. Also, for the PCell in the MeNB and the primary SCell (pSCell) in the SeNB, two PHs—a type-1 PH (PUSCH alone) and a type-2 PH (PUSCH+PUCCH) are calculated, and both PHs are included. Also, each cell's VPH is calculated and included. Note that the pSCell refers to a secondary cell (SCell) where the user terminal can transmit the PUCCH (Physical Uplink Control Channel).

Note that, although the example of FIG. 7 shows a MAC CE structure in which the real PHRs and virtual PHRs of all the cells the user terminal is connected with are included, regardless of which radio base station the information is reported to, this is by no means limiting. For example, MAC CE may be structured so that, amongst the real PHRs and virtual PHRs pertaining to all cells, only those virtual PHRs that pertain to radio base stations other than the radio base station of the target of reporting are included. To be more specific, MAC CE to be reported to the MeNB may be structured to include real PHRs for the MeNB and real PHRs and virtual PHRs for the SeNB, and not include virtual PHRs for the MeNB. In this case, the MAC CE that is given by removing the rows of $VPH_{Mi}$ from the MAC CE shown in FIG. 7 can be reported to the MeNB, so that it is possible to report the communication overhead pertaining to the reporting of virtual PHRs. Also, PHRs may be reported on a regular basis, or may be reported at timings where predetermined events occur.

Note that, when subframe timings are not synchronized between eNBs, real PHRs and virtual PHRs are calculated in different values depending on in what timing these PHRs are calculated. So, in dual connectivity, a structure may be employed, in which PHRs are calculated at timings that are based on uplink transmission timings in a cell belonging to a specific CG (for example, MCG). For example, given an uplink subframe of a PCell belonging to the MCG, PHRs may be calculated in the top part, in the middle part (which may be the end of the first-half slots, the beginning of the second-half slots, etc.) and so on. Also, transmission timings in an SCell belonging to the MCG, in a pSCell belonging to an SCG and so on may be the basis as well. By this means, it is possible to prevent user terminals from calculating and reporting PHs at inadequate timings depending on the implementation of each.

Also, when subframe timings are not synchronized between eNBs, real PHRs and/or virtual PHRs to report to eNBs may be calculated from the PHs of a predetermined time period (for example, a 1-ms period, which is equivalent to the subframe length). To be more specific, it may be possible to report the maximum PH, the minimum PH, the average PH and so on of this time period. Also, the predetermined time period may be determined based on an uplink transmission timing belonging to a given CG (for example, a subframe period of a PCell belonging to the MCG). By this means, it is possible to report PHs, from which the variation of transmission power in a time period, which arises when eNBs are asynchronous, is removed.

As described above, with the first embodiment, a user terminal reports real PHRs to a given radio base station, as well as virtual PHRs related to cells formed by other radio base stations. According to this structure, it is possible to lean, more accurately, information about the transmission power of counterpart eNBs with which the radio base station is engaged in dual connectivity together, based on real PHRs and virtual PHRs. For example, it is possible to know a counterpart eNB's PUSCH bandwidth, and know how much resources the counterpart eNB uses/needs, and so on.

Note that a radio base station may estimate transmission power (or transmission power density (PSD)) that depends upon counterpart eNBs' channel states (path loss and so on) based on virtual PHRs. PSD is the transmission power per PRB, which does not rely on the PUSCH bandwidth, and can be represented by, for example, following equation 3:

$$PSD = P_{O\_PUSCH,c}(j) + \alpha_c(j) \cdot PL_c + \Delta_{TF,c}(i) + f_c(i) \qquad \text{(Equation 3)}$$

From equation 2 and equation 3, a virtual PH can be represented as $P_{CMAX,c}(i)$ (the maximum transmission power)−PSD. Consequently, PSD can be estimated based on virtual PHRs.

Furthermore, based on virtual PHRs, the radio base station may estimate the MCS level selected in a counterpart eNB and the channel quality achieved therewith. The MCS level to be selected in the counterpart eNB is determined based on interference power, in addition to path loss, received power and so on. Consequently, by estimating the MCS level, it is possible to estimate the state of uplink transmission interference against the counterpart eNB.

As described above, by using the method according to the first embodiment, a radio base station can calculate other eNBs' transmission power control-related information such as path loss, PUSCH bandwidth, MCS, TPC commands and so on, based on combinations of real PHRs and virtual PHRs. By this means, a radio base station to employ dual connectivity can accurately learn the PH of each cell formed by other radio base stations, at timings where a user terminal reports PHRs. As a result of this, it is possible to adequately control the uplink transmission power of the user terminal, and reduce the decrease of uplink throughput.

Figure 8:
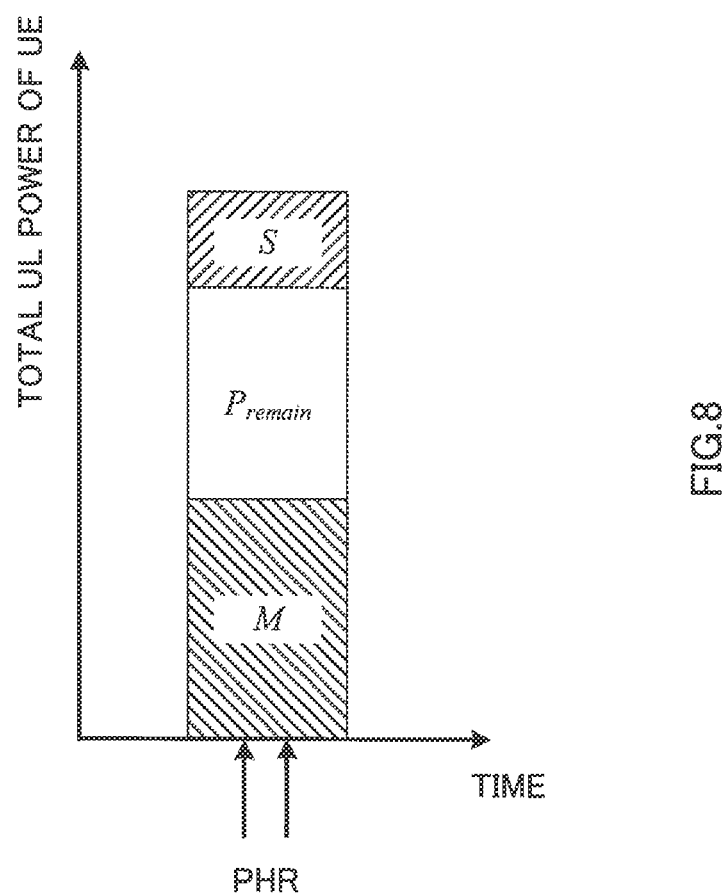
FIG. 8 is a diagram to explain an example of total extra transmission power in a user terminal.

FIG. 8 is a diagram to explain an example of total extra transmission power in a user terminal. FIG. 8 shows the transmission power for each cell in the total uplink transmission power of a given user terminal in a PH R transmission timing. Here, the portion where "M" is affixed is the transmission power for the MeNB, and the portion where "S" is affixed is the transmission power for the SeNB. Also, the portion where "$P_{remain}$" is affixed represents the total extra transmission power (remaining power). Here, the total extra transmission power refers to the sum of the extra transmission power for each cell, and, for example, refers to the user terminal's maximum transmission power minus the transmission power required for each cell (the power that is required for transmission). Although the total extra transmission power may be determined from the sum of the PHs of individual cells, in this case, it is preferable not to take into account negative PHs.

When only PHRs that are the same as in UL-CA shown in FIG. 5 are used, it is difficult to know $P_{remain}$ remain because it is not clear what is allocated to counterpart eNBs. Meanwhile, the method according to the first embodiment enable the MeNB and the SeNB to each calculate the uplink transmission power for the other radio base station, and learn $P_{remain}$ accurately.

(Variation 1)

Note that a user terminal may report a PSD, instead of a virtual PHR, to a radio base station. For example, the user terminal may report the PSD of a predetermined cell formed by that radio base station. According to this configuration, the radio base station no longer requires the operation for determining the PSD based on PHRs, and can determine power directly. Also, the radio base station can learn the PSD, adequately, regardless of the value of the maximum transmission power.

Also, the user terminal may report the PUSCH bandwidth (for example, $M_{PUSCH,c}(i)$ in equation 2), instead of a virtual PHR, to the radio base station. For example, the user terminal may report the PUSCH bandwidth of a predetermined cell formed by that radio base station. According to this configuration, the radio base station can learn the PUSCH bandwidth directly, and no longer requires the operation for determining the PSD based on PHRs. Also, in conventional LTE-A systems where the maximum bandwidth is 100 PRBs, all patterns can be represented by the minimum MAC CE unit (8 bits), so that the overhead can be reduced. Note that the PUSCH bandwidth to report may be the PUSCH bandwidth of a cell which the radio base station forms.

Second Embodiment

A second embodiment of the present invention provides an uplink transmission power control method for use when a plurality of radio base stations employing dual connectivity all know each cell's PH at timings a user terminal reports PHRs. Although the method of determining each cell's PH in the second embodiment uses the above-described method of the first embodiment, this is by no means limiting. Although the following description will be given based on the assumption that two radio base stations—namely, an MeNB and an SeNB—connect with a user terminal, this is by no means limiting.

According to the second embodiment, a user terminal distributes the total extra transmission power at a PHR reporting timing to each cell in a predetermined ratio. Also, until the next PHR reporting timing, signals are transmitted to each cell by using power with an addition of extra power that is distributed. Then, when the next PHR reporting timing comes, again, the total extra transmission power at that timing is distributed to each cell in a predetermined ratio.

Every time the radio base stations (MeNB and SeNB) receive a PHR, the radio base stations judge that the user terminal has distributed its total extra transmission power in a predetermined ratio, and each radio base station thinks that power with an addition of the distributed extra power transmission power is available for use until the next PHR is received, and carries out scheduling and transmission power control accordingly.

Figure 9:
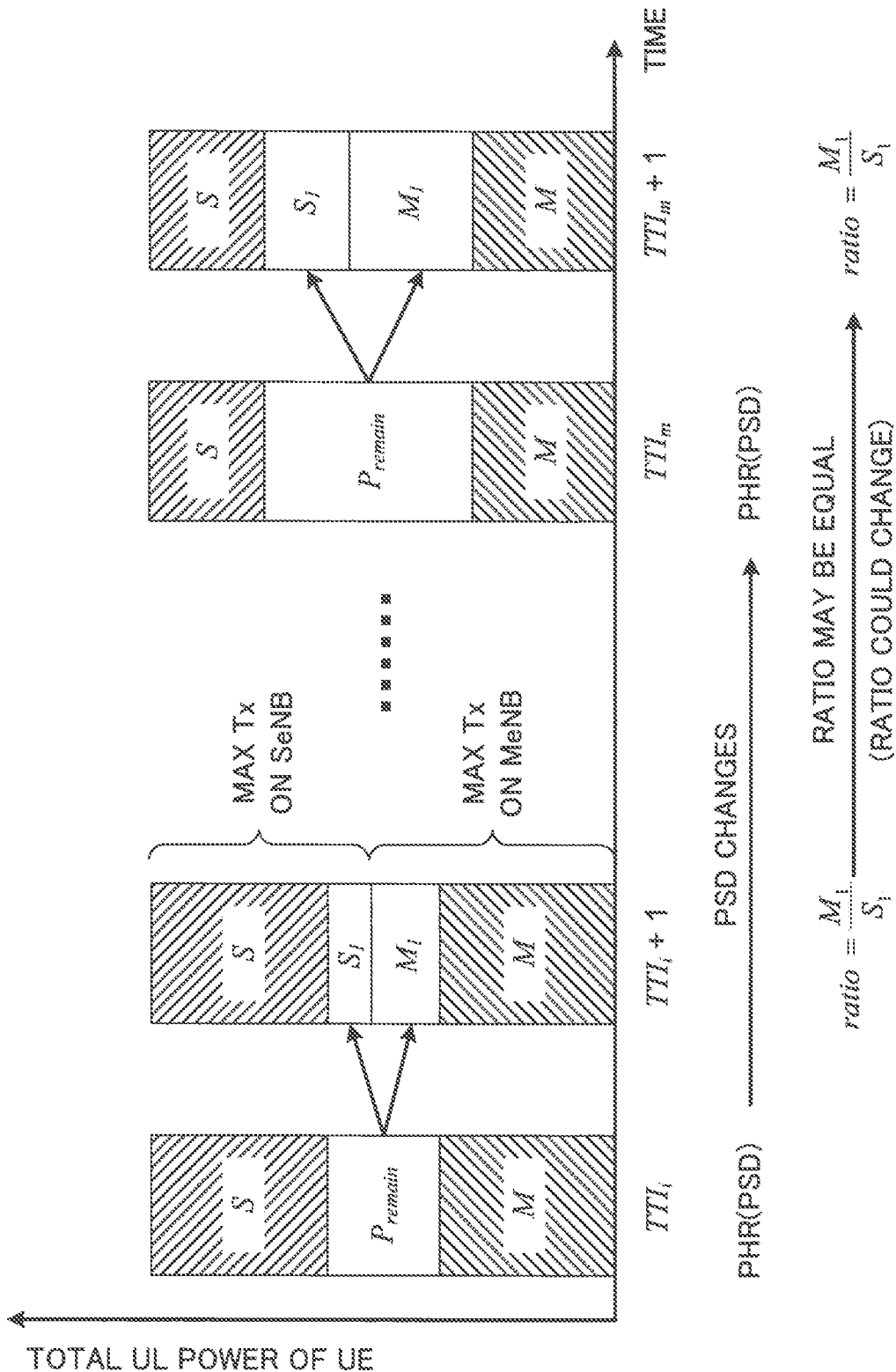
FIG. 9 is a diagram to explain an example of a transmission power control method according to a second embodiment.

FIG. 9 is a diagram to explain an example of a transmission power control method according to the second embodiment. At time TTIi, the user terminal reports a PHR (real PHR, virtual PHR), PSD, PUSCH bandwidth and so on, which have been described earlier with the first embodiment, to the radio base stations. At time $TTI_i+1$, the user terminal splits the total extra transmission power $P_{remain}$ into power $M_1$, which can be allocated to the MeNB, and power $S_1$, which can be allocated to the SeNB. Here, $M_1$ and $S_1$ are determined to fulfill a predetermined ratio (ratio=$M_1/S_1$). In this case, the power which the user terminal can allocate to the MeNB (Max Tx on MeNB) is $M+M_1$, and the power which the user terminal can allocate to the SeNB (Max Tx on SeNB) is $S+S_1$.

Then, at time $TTI_m$, the user terminal reports a PHR or PSD to the radio base stations again. Here, since the PSD has changed, the quantity of $P_{remain}$ has also changed from that at time $TTI_i$. At time $TTI_m+1$, the user terminal splits $P_{remain}$ into $M_1$ and $S_1$ again.

Note that information about the predetermined ratio for the distribution of total extra transmission power to each cell may be configured in the user terminal and in the radio base stations in advance, or may be reported to the user terminal as appropriate through higher layer signaling (for example, RRC signaling), broadcast signals and so on. Also, the predetermined ratio is preferably fixed, but may be structured to be changeable as well. For example, referring to the example of FIG. 9, if a change of the ratio values is reported to the user terminal between time $TTI_i+1$ and time $TTI_m+1$, power may be distributed using the values after the change. Also, power may be distributed at timings where a PHR or a PSD is reported (for example, time $TTI_i$, time $TTI_m$, etc.).

As described above, according to the second embodiment, a user terminal distributes its total extra transmission power at a predetermined PHR reporting timing to each cell in a predetermined ratio. According to this structure, it is possible to execute adequate transmission power control in an environment in which the required transmission power repeats a certain increase and decrease over a relatively long period.

Figure 10:
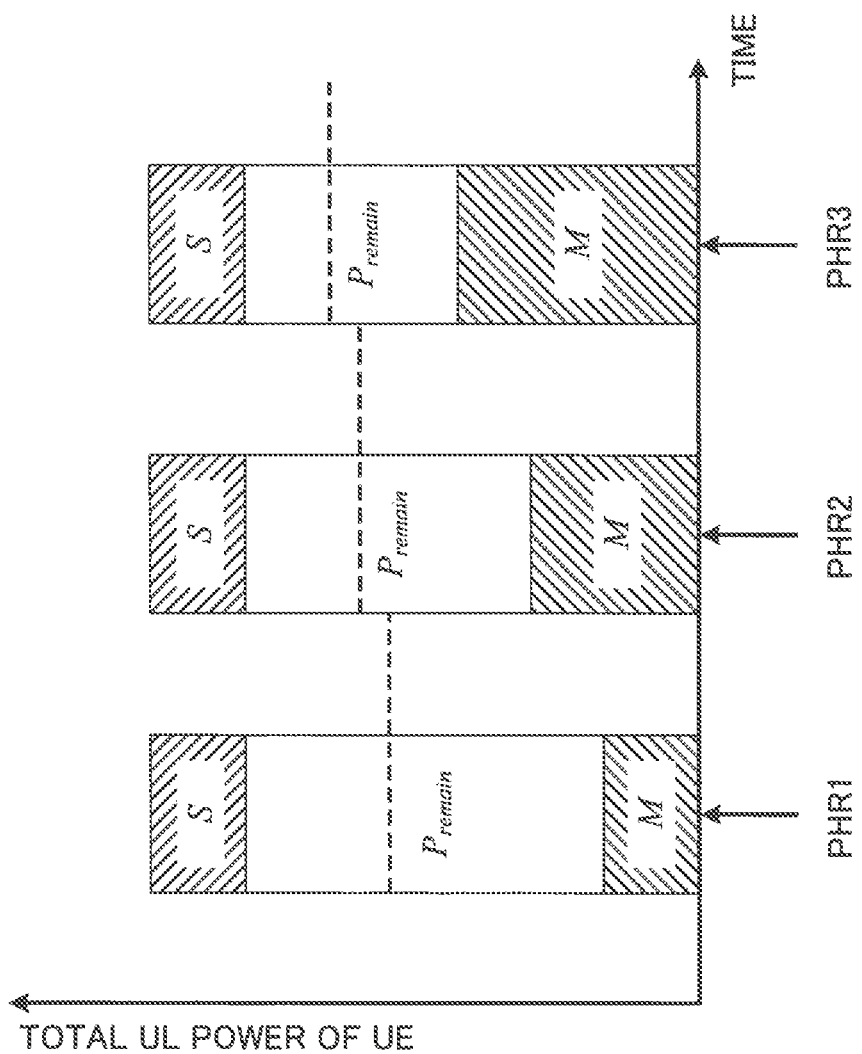
FIG. 10 is a diagram to explain an example of a transmission power control method according to the second embodiment.

Also, according to the transmission power control method of the second embodiment, when the required transmission power in an eNB increases and the supply of power thereto has to be increased, it is not necessary to send signaling. FIG. 10 is a diagram to explain an example of the transmission power control method according to the second embodiment. In this example, following the passage of time, a user terminal reports PHRs, in the order of PHR1, PHR2 and PHR3. Also, the chain lines show the borders of extra transmission power that can be allocated to the MeNB and the SeNB.

In the example of FIG. 10, although the required transmission power in the SeNB does not change, the required transmission power in the MeNB increases, following the passage of time. When the ratio for the distribution of extra power is fixed, if the power in the MeNB increases, the power that can be allocated to the MeNB increases as well. Consequently, without sending signaling regarding the power that can be allocated to the MeNB, a user terminal can execute control to increase the transmission power at every PHR reporting timing.

(Variation 2)

The second embodiment may be arranged so that, in predetermined cases, the total transmission power per user terminal is allocated to one eNB. At UL transmission timings where no PDSCH resource is allocated to cells other than a given cell, the allowable maximum power for this given cell can be controlled as the maximum transmission power per user terminal (the total transmission power before splitting). By this means, it is possible to prevent unwanted power split loss at timings where simultaneous UL transmissions are clearly unlikely to occur.

For example, when two radio base stations adopt dual connectivity, the total transmission power per user terminal may be allocated to one eNB in the following timings (a) to (c):
  (a) Assuming that at least one of the eNBs uses TDD alone, subframe timings where only the other eNB, not the first-mentioned eNB, is directed to UL (the first eNB is not directed to UL);
  (b) one eNB is in the DRX state (the PRACH alone is transmitted); and
  (c) the TA timer is expired in one eNB (the PRACH alone is transmitted). At the above timings, UL transmission takes place only in one eNB, so that the whole power can be allocated to one eNB.

Figure 11:
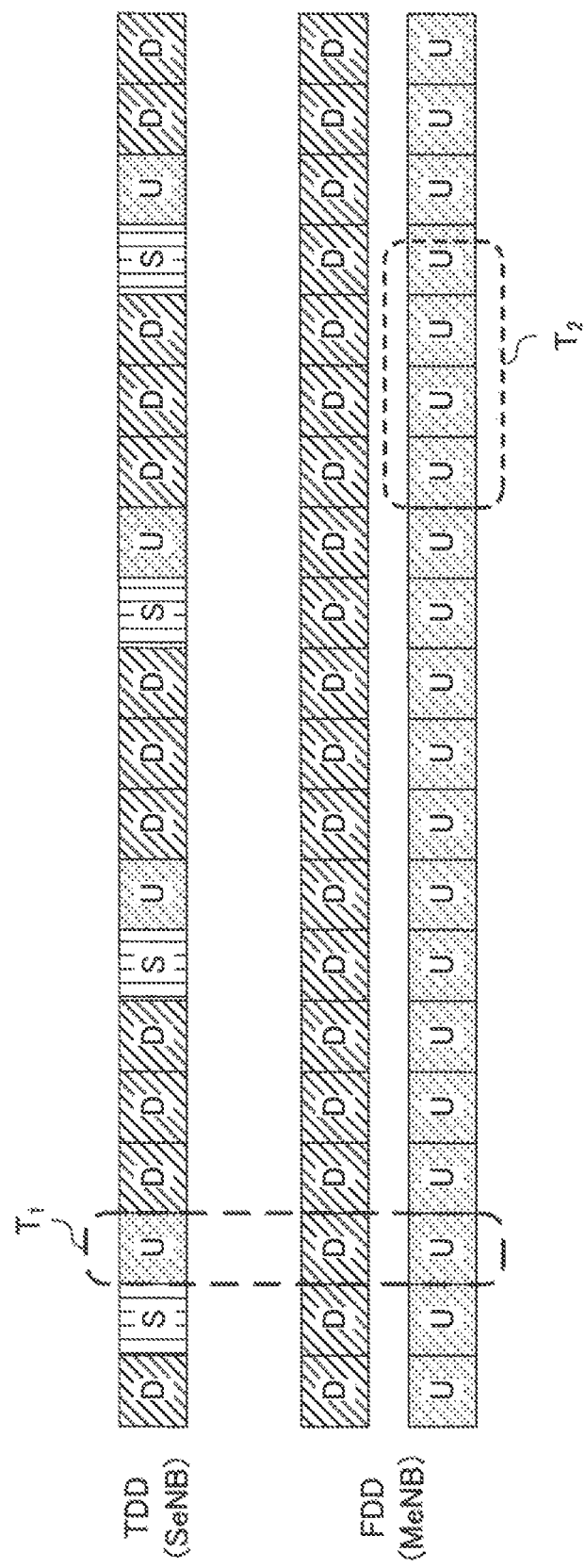
FIG. 11 is a diagram to show examples of control timings to allocate the total transmission power per user terminal to one eNB.

FIG. 11 is a diagram to show example control timings where the total transmission power per user terminal is allocated to one eNB. FIG. 11 shows subframe configurations in the event dual connectivity is carried out between an eNB (SeNB) that uses TDD and an eNB (MeNB) that uses FDD.

The timing of $T_1$ in FIG. 11 is a subframe in which the SeNB to use TDD performs UL transmission, so that there is a possibility of simultaneous UL transmissions from the MeNB and the SeNB. Consequently, as described earlier with the second embodiment, it is preferable to make the power after the split between the MeNB and the SeNB the maximum transmission power. Meanwhile, the timing of $T_2$ in FIG. 11 is a subframe in which the SeNB to use TDD carries out DL transmission, so that there is no possibility of simultaneous UL transmissions from the MeNB and the SeNB. In this case, it is possible to apply the maximum transmission power per user terminal to the MeNB.

Note that, with the first embodiment, too, in UL transmission timing where no PUSCH resource is allocated to cells other than a given cell, PHs may be calculated on the assumption that the allowable maximum power for this given cell is the maximum transmission power per user terminal. That is, it may be possible to switch the value of the maximum transmission power to use in PHR calculations in predetermined timings based on whether or not there is a possibility that simultaneous UL transmissions take place.

An example will be described with reference to FIG. 11. Since there is a possibility of simultaneous UL transmissions in the timing of $T_1$ in FIG. 11, it is preferable to calculate and report real PHRs and virtual PHRs, as described earlier with the first embodiment. Meanwhile, since there is no possibility of simultaneous UL transmissions in the timing of $T_2$ in FIG. 11, it is possible to calculate and report real PHRs to each cell.

(Structure of Radio Communication System)

Now, a structure of a radio communication system according to an embodiment of the present invention will be described below. In this radio communication system, the radio communication methods according to the above-described embodiments are employed. Note that the above embodiments may be employed independently, or may be employed in combination.

Figure 12:
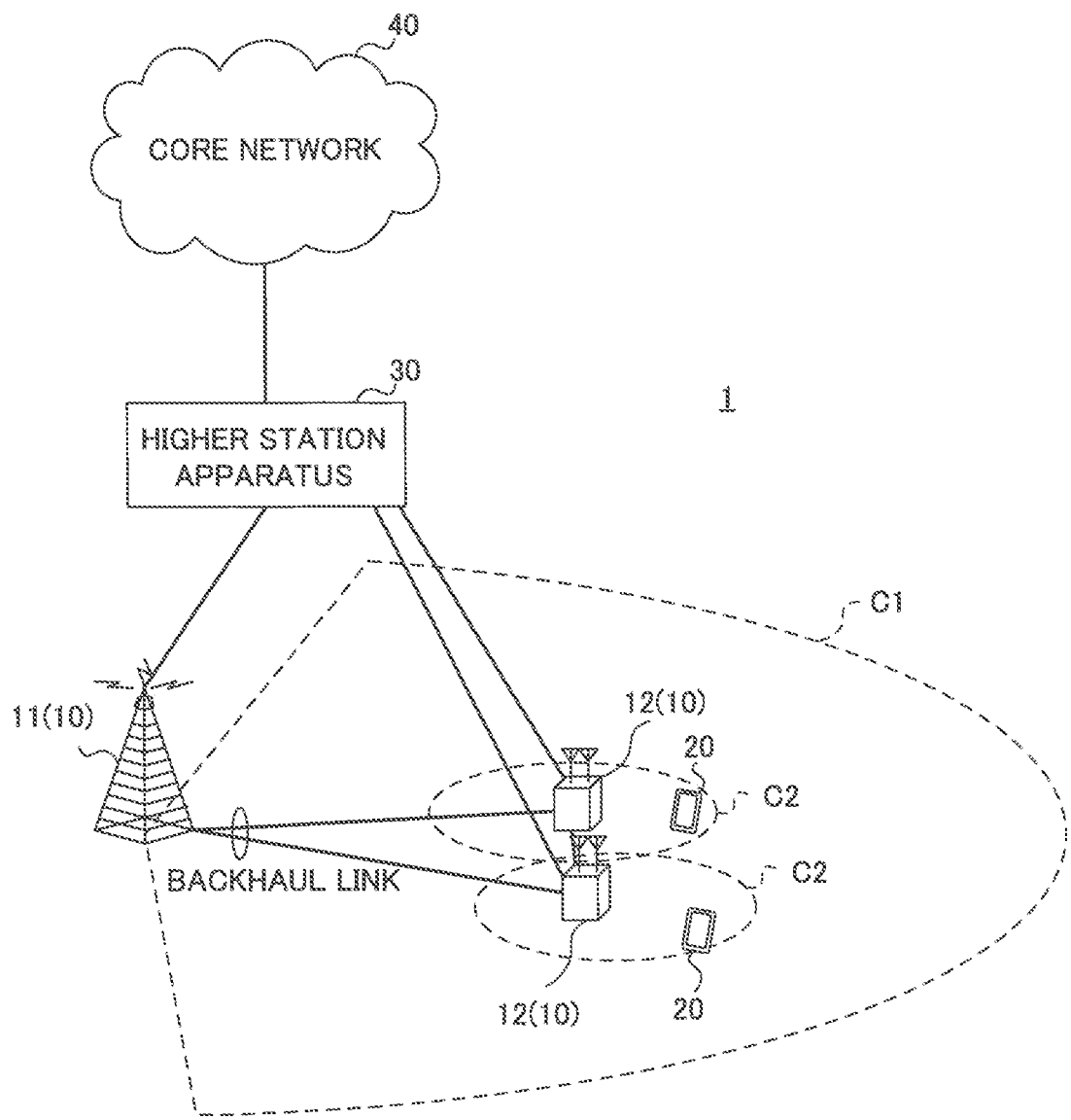
FIG. 12 is a diagram to show an example of a schematic structure of a radio communication system according to an embodiment of the present invention.

FIG. 12 is a schematic structure diagram to show an example of the radio communication system according to an embodiment of the present invention. As shown in FIG. 12, the radio communication system 1 is comprised of a plurality of radio base stations 10 (11 and 12), and a plurality of user terminals 20 that are present in cells formed by radio base stations 10, and that are configured to be capable of communicating with each radio base station 10. The radio base stations 10 are each connected with a higher station apparatus 30, and are connected to a core network 40 via the higher station apparatus 30.

In FIG. 12, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 12.

The macro cell C1 and the small cells C2 may use the same frequency band or may use different frequency bands.

Also, the radio base stations 11 and 12 are connected with each other via an inter-base station interface (for example, optical fiber, the X2 interface, etc.).

Note that the macro base station 11 may be referred to as an "eNodeB (eNB)," a "radio base station," a "transmission point" and so on. The small base stations 12 may be referred to as "RRHs (Remote Radio Heads)," "pico base stations," "femto base stations," "home eNodeBs," "transmission points," "eNodeBs (eNBs)" and so on.

The user terminals 20 are terminals to support various communication schemes such as LTE, LTE-A and so on, and may include both mobile communication terminals and stationary communication terminals. The user terminals 20 can communicate with other user terminals 20 via radio base stations 10.

Note that the higher station apparatus 30 may be, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. Note that the uplink and downlink radio access schemes are not limited to combinations of these.

Also, in the radio communication system 1, a downlink shared channel (PDSCH: Physical Downlink Shared Channel), which is used by each user terminal 20 on a shared basis, downlink control channels (PDCCH (Physical Downlink Control Channel), EPDCCH (Enhanced Physical Downlink Control Channel), etc.), a broadcast channel (PBCH) and so on are used as downlink channels. User data, higher layer control information and predetermined SIBs (System Information Blocks) are communicated in the PDSCH. Downlink control information (DCI) is communicated by the PDCCH and the EPDCCH. Also, MIBs (Master Information Blocks) and so on are communicated by the PBCH.

Also, in the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink channels. User data and higher layer control information are communicated by the PUSCH.

Figure 13:
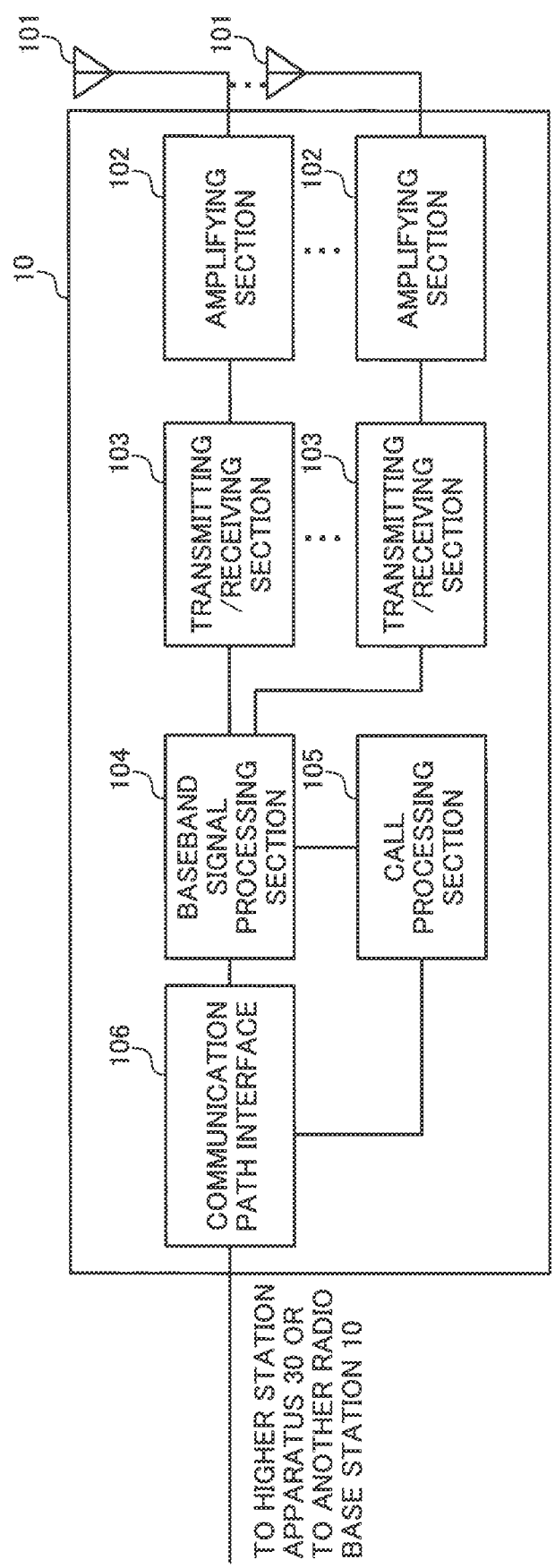
FIG. 13 is a diagram to show an example of an overall structure of a radio base station according to an embodiment of the present invention.

FIG. 13 is a diagram to show an overall structure of a radio base station 10 according to the present embodiment. The radio base station 10 has a plurality of transmitting/receiving antennas 101 for MIMO communication, amplifying sections 102, transmitting/receiving sections (receiving sections) 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control (for example, an HARQ (Hybrid ARQ) transmission process), scheduling, transport format selection, channel coding, an inverse fast Fourier transform (IFFT) process and a precoding process are performed, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, which are pre-coded and output from the baseband signal processing section 104 on a per antenna basis, into a radio frequency band. Also, the transmitting/receiving sections 103 constitute the transmission section of the present embodiment. The amplifying sections 102 amplify the radio frequency signals having been subjected to frequency conversion, and transmit the resulting signals through the transmitting/receiving antennas 101.

On the other hand, as for uplink signals, radio frequency signals that are received in the transmitting/receiving antennas 101 are each amplified in the amplifying sections 102, converted into the baseband signal through frequency conversion in each transmitting/receiving section 103, and input into the baseband signal processing section 104.

In the baseband signal processing section 104, user data that is included in the uplink signals that are input is subjected to an fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 14:
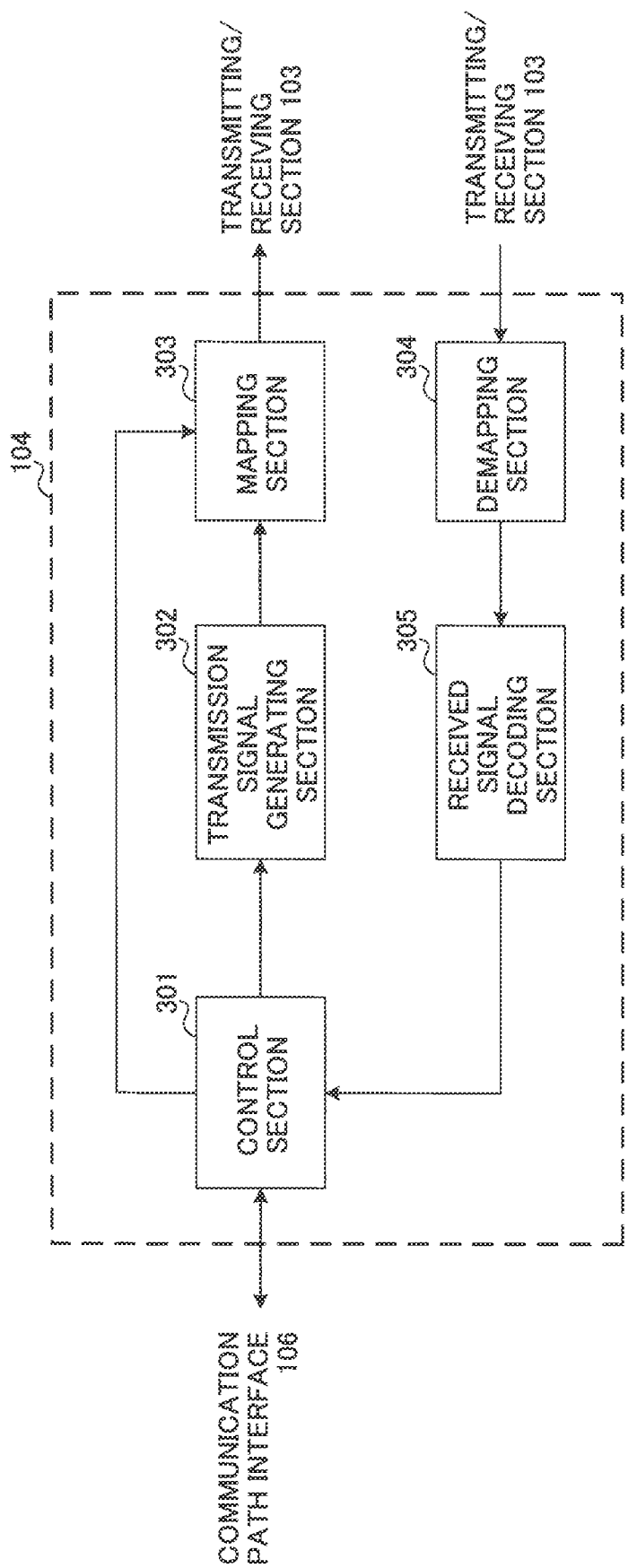
FIG. 14 is a diagram to show an example of a functional structure of a radio base station according to an embodiment of the present invention.

FIG. 14 is a diagram to show a principle functional structure of the baseband signal processing section 104 provided in a radio base station 10 according to the present embodiment. As shown in FIG. 14, the baseband signal processing section 104 provided in the radio base station 10 is comprised at least of a control section 301, a transmission signal generating section 302, a mapping section 303, a demapping section 304 and a received signal decoding section 305.

The control section 301 controls the scheduling of downlink user data that is transmitted in the PDSCH, downlink control information that is transmitted in one or both of the PDCCH and the enhanced PDCCH (EPDCCH), downlink reference signals and so on. Also, the control section 301 also controls the scheduling of RA preambles transmitted in the PRACH, uplink data that is transmitted in the PUSCH, uplink control information that is transmitted in the PUCCH or the PUSCH, and uplink reference signals (allocation control). Information about the allocation control of uplink signals (uplink control signals, uplink user data, etc.) is reported to the user terminal 20 by using a downlink control signal (DCI).

The control section 301 controls the allocation of radio resources to downlink signals and uplink signals based on command information from the higher station apparatus 30, feedback information from each user terminal 20, and so on. That is, the control section 301 functions as a scheduler.

The control section 301 controls the transmission signal generating section 302 and the mapping section 303 so as to adjust the uplink signal transmission power of user terminals 10 connected with the radio base station 20.

To be more specific, the control section 301 commands the transmission signal generating section 302 to generate transmission power control (TPC) commands based on PHRs and channel state information (CSI) reported from the user terminals 20, uplink data error rate, the number of times of HARQ retransmissions and so on, and controls the mapping section 303 to include the TPC commands in downlink control information (DCI) and report this to the user terminals 20. Note that the PHRs may be included and reported in MAC CE as well.

The control section 301 acquires information about the uplink transmission power for each radio base station 10, with which the user terminals 20 are connected, based on the PHRs reported from the user terminals 20. To be more specific, the control section 301 acquires information about the transmission power of the cell where the subject radio base station belongs, based on real PHRs reported from the user terminals 20.

Also, the control section 301 acquires information about the transmission power of cells where the subject radio base station does not belong, based on real PHRs and virtual PHRs reported from the user terminals 20 (first embodiment). To be more specific, the PUSCH bandwidth, channel states (path loss and so on), transmission power density (PSD), MCS level, channel quality and so on of cells formed by other radio base stations 10 may be estimated as transmission power-related information.

Also, the control section 301 calculates (estimates) the total extra transmission power of a user terminal based on real PHRs and virtual PHRs reported from the user terminals 20 (second embodiment). In this case, until the next PHR is received, the control section 301 may judge that the user terminal 20 splits the total extra transmission power in a predetermined ratio, and, thinking that power with the extra transmission power after the splitting is available for use, carry out scheduling and transmission power control accordingly.

Note that the above-noted predetermined ratio may be determined in the control section 301, or may be input from outside via a communication path interface 106. Also, the control section 301 may command the transmission signal generating section 302 to generate information related to the above predetermined ratio.

The downlink control signal generating section 302 generates downlink control signals, downlink data signals, downlink reference signals and so on that are determined to be allocated by the control section 301. To be more specific, the downlink control signal generating section 302 generates a downlink assignment, which reports downlink signal allocation information, and an uplink grant, which reports uplink signal allocation information, based on commands from the control section 301. The downlink data signals are subjected to a coding process and a modulation process, using coding rates and modulation schemes that are determined based on CSI from each user terminal 20 and so on.

Also, the transmission signal generating section 302 may generate information about the predetermined ratio for the distribution of total extra transmission power to each cell in the form of downlink control information (DCI) for the downlink control channel (PDCCH and/or EPDCCH) based on commands from the control section 301, or in the form of higher layer signaling (for example, RRC signaling) and/or broadcast signals (for example, SIB).

The mapping section 303 maps the downlink signals generated in the transmission signal generating section 302 to radio resources based on commands from the control section 301, and outputs these to the transmitting/receiving sections 103.

The demapping section 304 demaps the signals received in the transmitting/receiving sections 103 and outputs the separated signals to the received signal decoding section 305. To be more specific, the demapping section 304 demaps the uplink signals transmitted from the user terminals 20.

The received signal decoding section 305 decodes the signals (for example, delivery acknowledgement signals) transmitted from the user terminals 20 in uplink control channels (the PRACH, the PUCCH, etc.) and the data signals (PUSCH), and outputs the results to the control section 301. Also, information included in the MAC CE reported from the user terminals 20 is also output to the control section 301.

Figure 15:
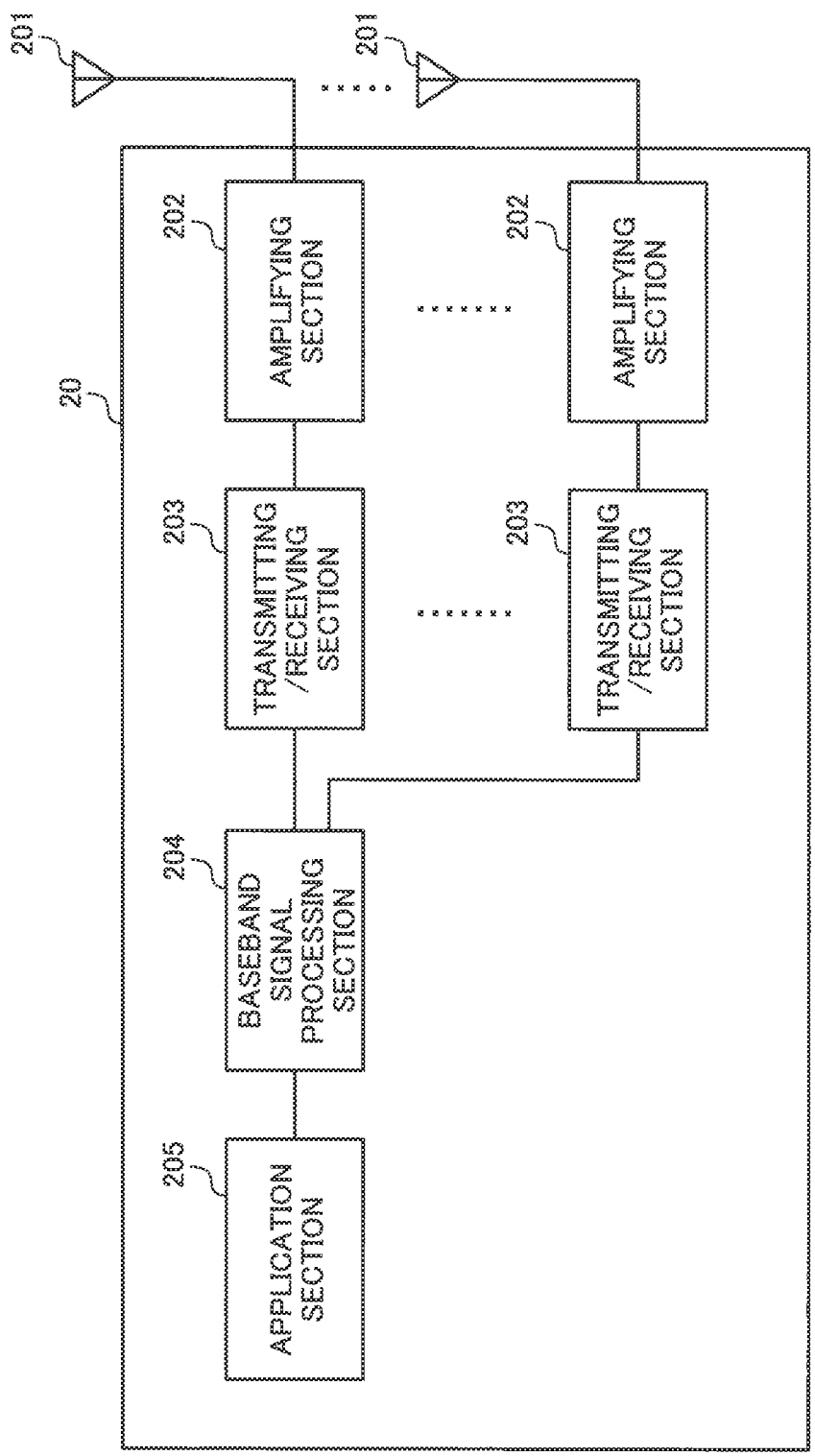
FIG. 15 is a diagram to show an example of an overall structure of a user terminal according to an embodiment of the present invention.

FIG. 15 is a diagram to show an overall structure of a user terminal 20 according to the present embodiment. As shown in FIG. 15, the user terminal 20 has a plurality of transmitting/receiving antennas 201 for MIMO communication, amplifying sections 202, transmitting/receiving sections (transmitting sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. In the baseband signal processing section 204, a retransmission control transmission process (for example, HARQ transmission process), channel coding, precoding, a discrete Fourier transform (DFT) process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Figure 16:
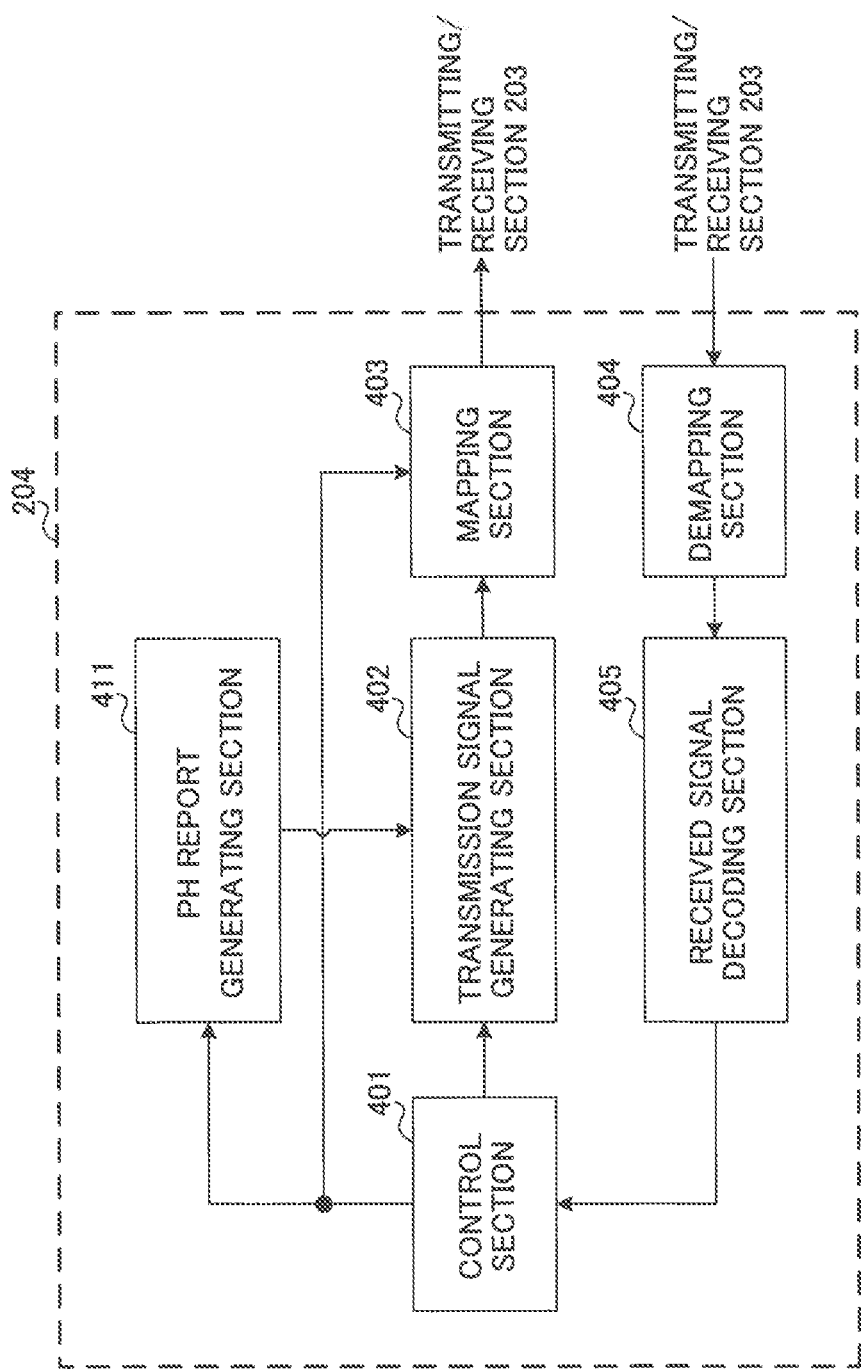
FIG. 16 is a diagram to show an example of a functional structure of a user terminal according to an embodiment of the present invention.

FIG. 16 is a diagram to show a principle functional structure of the baseband signal processing section 204 provided in the user terminal 20. As shown in FIG. 16, the baseband signal processing section 204 provided in the user terminal 20 is comprised at least of a control section (transmission power control section) 401, a transmission signal generating section 402, a mapping section 403, a demapping section 404, a received signal decoding section 405 and a PH report generating section 411. Note that the control section 401 constitutes the transmission power control section according to the present embodiment.

The control section 401 controls the generation of uplink control signals (HARQ-ACK signals and so on) and uplink data signals based on downlink control signals (PDCCH signals) transmitted from the radio base stations 10, results of deciding whether or not retransmission control is possible in response to PDSCH signals that are received, and so on. The downlink control signals received from the radio base stations are output from the received signal decoding section 405.

Also, the control section 401 executes control so that either the amount of PDSCH resources allocated (PUSCH bandwidth) to a cell formed by a given radio base station 20 or transmission power-related information that does not rely on this bandwidth, and information about the extra transmission power for this cell are transmitted to a radio base station apart from the above given radio base station 20.

To be more specific, the control section 401 commands the PH report generating section 411 to calculate real PHs (the conventional PH used up to LTE Rel. 11) and virtual PHs, which include PHs that do not rely on the PUSCH bandwidth, and generate real PHRs and virtual PHRs.

Based on the commands from the control section 401, the PH report generating section 411 calculates real PHs and virtual PHs, generate real PHRs and virtual PHRs, and outputs these to the transmission signal generating section 402.

For example, referring to the system structure of FIG. 12 as an example, the control section 401 controls the PH report generating section 411, the transmission signal generating section 402 and the mapping section 403 so that a real PHR is reported to the radio base station 11 as a PHR pertaining to cell C1, and a real PHR and a virtual PHR are reported as PHRs pertaining to cell C2 formed by a radio base station 12 apart from the radio base station 11. In this case, for the virtual PHR, for example, a PHR to include a PH that is calculated on the assumption that the PUSCH bandwidth for cell C2 is one RB may be used.

Also, the control section 401 may execute control so that a PSD is reported or the PUSCH bandwidth is reported to the radio base station 10.

Also, the control section 401 controls the uplink transmission power of the user terminals 20. To be more specific, the control section 401 controls each cell's transmission power based on signaling (for example, TPC commands) from each radio base station 20. Also, when information about the predetermined ratio for use when distributing total extra transmission power to each cell is reported to or configured in the user terminals 20 in advance, the control section 401 can distribute the total extra transmission power at PHR reporting timings to each cell in a predetermined ratio (second embodiment). Also, it is equally possible to execute control so that the total transmission power per user terminal is allocated to a given radio base station 10 in a timing where simultaneous UL transmissions do not take place (variation 2).

The transmission signal generating section 402 generates uplink control signals such as, for example, delivery acknowledgement signals (HARQ-ACK) and channel state information (CSI) based on commands from the control section 401. Also, the transmission signal generating section 402 generates uplink data signals based on commands from the control section 401. Note that, when a UL grant is included in a downlink control signal reported from the radio base stations, the control section 401 commands the transmission signal generating section 402 to generate an uplink data signal.

Also, the transmission signal generating section 402 turns the information about each cell's extra transmission power, as well as information such as real PHRs, virtual PHRs, PSD, the PUSCH bandwidth and so on, input from the PH report generating section 411, into transmission signals. Note that real PHRs and virtual PHRs are preferably included in MAC CE. Also, real PHRs, PSD and/or the PUSCH bandwidth may be all included in MAC CE together.

The mapping section 403 maps the uplink signals generated in the transmission signal generating section 402 to radio resources and output the result to the transmitting/receiving section 203 based on commands from the control section 401.

The demapping section 404 demaps the signals received in the transmitting/receiving sections 203 and outputs the separated signals to the received signal decoding section 405. To be more specific, the demapping section 404 demaps the downlink signals transmitted from the radio base station 10.

The received signal decoding section 405 decodes the downlink control signals (PDCCH signals) transmitted in the downlink control channel (PDCCH), and outputs the scheduling information (uplink resource allocation information), information about the cells to which delivery acknowledgement signals in response to the downlink control signals are fed back, TPC commands and so on, to the control section 401.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is only provided for the purpose of illustrating examples, and should by no means be construed to limit the present invention in any way.

The disclosure of Japanese Patent Application No. 2014-058670, filed on Mar. 20, 2014, including the specification, drawings and abstract, is incorporated herein by reference in its entirety.

The invention claimed is:

1. A terminal that communicates by using a plurality of cell groups in dual connectivity (DC), comprising:
    a processor that generates PH reports, including a PH (Power Headroom) of every cell forming the cell groups in the DC; and
    a transmitter that transmits the PH reports generated for each cell group in the DC,
    wherein a PH report which the transmitter transmits in a given cell group in the DC includes a PH that pertains to another cell group in the DC and that does not rely on a PUSCH (Physical Uplink Shared Channel) bandwidth,
    wherein the processor calculates the PH, based on an uplink transmission timing when the PUSCH is transmitted in uplink subframes of a particular cell, included in the PH report which the transmitter transmits in the given cell group, using the uplink transmission timing of a cell belonging to the given cell group, and
    wherein the uplink transmission timing is a whole or a part of the uplink subframes of the particular cell belonging to the given cell group.

2. The terminal according to claim 1, wherein the PH that does not rely on the PUSCH bandwidth is a PH that is calculated based on an assumption that the PUSCH bandwidth is one resource block.

3. The terminal according to claim 1, wherein the PH report which the transmitter transmits in the given cell group includes PHs of all activated cells.

4. The terminal according to claim 1, wherein the plurality of cell groups are comprised of cells formed by mutually varying base stations.

5. A base station that communicates with a terminal by using a predetermined cell group in dual connectivity (DC), the terminal communicating by using a plurality of cell groups in the DC, the base station comprising:
- a receiver that receives PH reports, which include a PH (Power Headroom) of every cell forming the cell groups in the DC; and
- a processor that controls uplink transmission power of the terminal based on the PH reports,
- wherein the PH reports include a PH that pertains to another cell group in the DC and that does not rely on a PUSCH (Physical Uplink Shared Channel) bandwidth,
- wherein the PH, based on an uplink transmission timing when the PUSCH is transmitted in uplink subframes of a particular cell, included in the PH report is calculated using the uplink transmission timing of a cell belonging to the predetermined cell group, and
- wherein the uplink transmission timing is a whole or a part of the uplink subframes of the particular cell belonging to the predetermined cell group.

6. A radio communication method for a terminal that communicates by using a plurality of cell groups in dual connectivity (DC), the radio communication method comprising the steps of:
- generating PH reports, including a PH (Power Headroom) of every cell forming the cell groups in the DC; and
- transmitting the PH reports generated for each cell group in the DC,
- wherein a PH report transmitted in a predetermined cell group in the DC includes a PH that pertains to another cell group in the DC and that does not rely on a PUSCH (Physical Uplink Shared Channel) bandwidth,
- wherein the PH, based on an uplink transmission timing when the PUSCH is transmitted in uplink subframes of a particular cell, included in the PH report transmitted in the given CG is calculated using the uplink transmission timing of a cell belonging to the predetermined cell group, and
- wherein the uplink transmission timing is a whole or a part of the uplink subframes of the particular cell belonging to the predetermined cell group.

7. A radio communication system comprising:
a terminal that communicates by using a plurality of cell groups in dual connectivity (DC); and
a base station that communicates with the terminal by using a given cell group in the DC, the terminal comprising:
- a processor that generates a PH (Power Headroom) report including a PH of every cell forming each of the cell groups in the DC; and
- a transmitter that transmitter transmits the PH report generated for each of the cell groups in the DC,
- wherein a PH report which the transmitter transmits in the given cell group in the DC includes a PH that pertains to another cell group in the DC and that does not rely on a PUSCH (Physical Uplink Shared Channel) bandwidth,
- wherein the processor calculates the PH, based on an uplink transmission timing when the PUSCH is transmitted in uplink subframes of a particular cell, included in the PH report which the transmitter transmits in the given cell group, using the uplink transmission timing of a cell belonging to the given cell group, and
- wherein the uplink transmission timing is a whole or a part of the uplink subframes of the particular cell belonging to the given cell group.

* * * * *